United States Patent
Zandtner et al.

(10) Patent No.: US 11,643,786 B2
(45) Date of Patent: May 9, 2023

(54) CONSTRUCTION METHOD

(71) Applicant: BAUER Spezialtiefbau GmbH, Schrobenhausen (DE)

(72) Inventors: Florian Zandtner, Altomünster/Thalhausen (DE); Michael Reiter, Rennertshofen (DE)

(73) Assignee: BAUER Spezialtiefbau GmbH, Schrobenhausen (DE)

( * ) Notice: Subject to any disclaimer, the term of this patent is extended or adjusted under 35 U.S.C. 154(b) by 0 days.

(21) Appl. No.: 16/630,405

(22) PCT Filed: Jan. 17, 2019

(86) PCT No.: PCT/EP2019/051167
§ 371 (c)(1),
(2) Date: Jan. 10, 2020

(87) PCT Pub. No.: WO2019/166152
PCT Pub. Date: Sep. 6, 2019

(65) Prior Publication Data
US 2020/0399852 A1    Dec. 24, 2020

(30) Foreign Application Priority Data

Mar. 1, 2018 (EP) .................................. 18159379

(51) Int. Cl.
| | |
|---|---|
| E02D 35/00 | (2006.01) |
| E02D 17/02 | (2006.01) |
| E02D 5/00 | (2006.01) |
| E02D 5/24 | (2006.01) |
| E02D 5/80 | (2006.01) |
| E02D 7/00 | (2006.01) |
| G05B 15/02 | (2006.01) |

(52) U.S. Cl.
CPC .............. *E02D 17/02* (2013.01); *E02D 5/00* (2013.01); *E02D 5/24* (2013.01); *E02D 5/80* (2013.01); *E02D 5/808* (2013.01); *E02D 7/00* (2013.01); *G05B 15/02* (2013.01); *E02D 2250/003* (2013.01); *E02D 2250/0038* (2013.01); *E02D 2600/10* (2013.01)

(58) Field of Classification Search
CPC .. E02D 17/02; E02D 5/00; E02D 5/24; E02D 5/80; E02D 5/808; E02D 7/00; E02D 2250/003; E02D 2250/0038; E02D 2600/10; E02D 17/18; E02D 35/00; G05B 15/02; E02F 9/205; E02F 9/2054; E02F 9/262; G05D 1/0278; G05D 2201/0202

See application file for complete search history.

(56) References Cited

U.S. PATENT DOCUMENTS

| | | | | |
|---|---|---|---|---|
| 5,701,691 A * | 12/1997 | Watanabe | ................ | E02F 3/435 701/50 |
| 5,735,065 A * | 4/1998 | Yamagata | ............... | E02F 3/437 701/50 |
| 5,960,378 A * | 9/1999 | Watanabe | ................. | E02F 3/32 37/415 |
| 6,076,030 A * | 6/2000 | Rowe | ..................... | G05B 19/19 701/50 |
| 2008/0162004 A1* | 7/2008 | Price | .................... | G05D 1/0251 701/50 |
| 2011/0008111 A1* | 1/2011 | Jinnings | .................... | E02D 5/04 405/232 |
| 2012/0136508 A1* | 5/2012 | Taylor | ................... | E02F 9/2045 701/25 |
| 2012/0207549 A1* | 8/2012 | Wegener | ................. | E02D 27/48 405/184.4 |
| 2013/0311031 A1* | 11/2013 | Friend | ..................... | E02F 9/205 701/50 |
| 2015/0276468 A1* | 10/2015 | Jaeger | ...................... | G01G 9/00 382/154 |
| 2016/0312432 A1* | 10/2016 | Wang | .................... | E02F 9/2012 |
| 2016/0312446 A1* | 10/2016 | Pettersson | ............. | H04N 7/181 |
| 2018/0044888 A1* | 2/2018 | Chi | ..................... | G06F 16/2455 |
| 2018/0210454 A1* | 7/2018 | Ready-Campbell | .... | G06T 17/05 |

FOREIGN PATENT DOCUMENTS

| | | |
|---|---|---|
| CN | 204705353 U | 10/2015 |
| DE | 10 2007 008881 A1 | 8/2008 |
| WO | 01/04576 A1 | 1/2001 |
| WO | 2017/028951 A1 | 2/2017 |

OTHER PUBLICATIONS

International Preliminary Report on Patentability and Written Opinion issued in PCT/EP2019/051167; dated Sep. 1, 2020.

(Continued)

*Primary Examiner* — Edwin J Toledo-Duran
(74) *Attorney, Agent, or Firm* — Studebaker & Brackett PC

(57) ABSTRACT

The invention relates to a construction method, in which an excavation pit is produced in the ground and in the excavation pit foundation elements are produced at predetermined working points with at least one working apparatus. According to the invention provision is made in that in a computer unit the dimensions of the excavation pit, the working points and the dimensions of the at least one working apparatus are entered and in that in the computer unit a required workspace for the at least one working apparatus and an open space in the excavation pit are determined automatically.

13 Claims, No Drawings

(56) References Cited

OTHER PUBLICATIONS

International Search Report issued in PCT/EP2019/051167; dated Apr. 10, 2019.
Lu Kaiming et al.; "Key Technologies for Construction of Long-span spatial Steel Structures"; Jiangsu University Press; Dec. 2017; pp. 235-242; China.
An Office Action mailed by National Intellectual Property Administration, P.R. China dated Jul. 19, 2021, which corresponds to Chinese Patent Application No. 201980003610.8 and is related to U.S. Appl. No. 16/630,405; with English language translation.
Zhang Jian-Zhong et al., "Application of BIM in the Whole Life Cycle of Hospital Buildings", pp. 259-275 (Section 6.2.2), Sep. 30, 2017, Tongji University Press.
An Office Action mailed by China National Intellectual Property Administration dated Jul. 8, 2022, which corresponds to Chinese Patent Application No. 201980003610.8 and is related to U.S. Appl. No. 16/630,405; with English language translation.

\* cited by examiner

CONSTRUCTION METHOD

The invention relates to a construction method, in which an excavation pit is produced in the ground and in the excavation pit foundation elements are produced at predetermined working points with at least one working apparatus, in accordance with the preamble of claim 1.

In larger construction projects excavation pits are produced, in which additional foundation measures are to be carried out subsequently. These foundation measures can be the tie-back anchoring of retaining walls or base plates or also the production of foundation piles. For such measures the introduction of corresponding working apparatuses, such as anchor or pile drilling apparatuses, is required. At the same time it is frequently necessary to carry out further construction measures inside the excavation pit, wherein especially in the case of inner-city construction sites the excavation pit is also used as a storage space.

The invention is based on the object to provide a construction method involving the production of an excavation pit, which can be carried out in a particularly efficient manner.

In accordance with the invention the object is achieved by a construction method having the features of claim 1. Preferred embodiments of the construction method are stated in the dependent claims.

The construction method according to the invention is characterized in that in a computer unit the dimensions of the excavation pit, the working points and the dimensions of the at least one working apparatus are entered and in that in the computer unit a required workspace for the at least one working apparatus and an open space in the excavation pit are determined automatically.

A basic idea of the invention can be seen in the fact that in the confined dimensions of an excavation pit an allocation of the available space into a required workspace and an open space is carried out. Especially for the production of foundation elements complex special-purpose machines are required, the work assignment of which can be planned as efficiently as possible. In accordance with one aspect of the invention this is achieved in that the dimensions of the at least one working apparatus are stored in a computer unit. The dimensions can be understood both as the space required by the working apparatus and the necessary working range which, in the case of a drilling apparatus having a pivotable upper carriage for example, can also comprise the pivoting range. Depending on an entry relating to the size of the excavation pit and the provided working points at which a foundation element is to be produced with the respective working apparatus the required workspace can thus be determined. From this also results an open space in the excavation pit which, in accordance with the invention, is also defined by the computer unit. This open space can then be utilized in a desired way, e.g. for depositing tools, apparatuses, working materials or other storage material, without interfering with the working process for the production of the foundation elements. Provision can be made for a database, in which the data concerning possible working apparatuses are recorded and stored. An operator can then retrieve the required data by easy selection of the working apparatus or apparatuses.

A preferred further development of the method according to the invention resides in the fact that as working apparatus a pile drilling apparatus, an anchor drilling apparatus and/or a diaphragm wall apparatus can be used. A pile drilling apparatus is required in particular for producing vertical foundation piles. By way of an anchor drilling apparatus in particular tension anchors for a tie-back anchoring of retaining walls of the excavation pit can be introduced. Provision can also be made for injection drilling apparatuses e.g. to produce a base or sealing plate in the ground by injecting a corresponding slurry. As diaphragm wall apparatus use can in particular be made of a diaphragm wall grab or a trench cutter for producing a diaphragm wall. Other types of specialist foundation engineering apparatuses can be employed too.

Within the meaning of the invention a foundation element is to be understood in a broad sense in that every element used for the formation of the excavation pit or in the excavation pit is such a foundation element. According to a further development of the invention it is particularly preferred that as foundation element a foundation pile, a tension anchor, an injection anchor and/or a diaphragm wall is produced. Basically, other foundation elements can also be produced as required in the excavation pit, such as a sheet pile wall, a soil mixing wall, HDI-elements etc.

A particularly preferred method variant of the invention resides in the fact that for the determined spaces it is specified which part is provided as driveway or storage space. Depending on the progress of work the driveway can be both part of the workspace and part of the open space. A storage space, on the other hand, is determined and specified by the computer unit especially if the said space is required neither as workspace for the production of a foundation element nor for the displacement of the at least one working apparatus.

According to a further development another advantageous method resides in the fact that a display means is provided, with which the workspace and/or the open space in the excavation pit is displayed. In particular, by way of the display means a separating line, which separates workspace and open space from each other, can be displayed directly on the base of the excavation pit.

Preferably, this can be implemented in that the display means comprises an optical projection element, in particular a laser. Such a display means, which is installed at an elevated point in the excavation pit, for instance on the mast of a working apparatus, an elevation on the edge of the excavation pit or on a flying drone, thus makes it possible to pre-display an area. This optical marking can then be retraced by working staff by means of color as a permanent marking on the base of the excavation pit. The display means is preferably controlled via a wireless connection by the computer unit.

Another preferred method variant can be seen in the fact that a working sequence can be entered into the computer unit or is predetermined by the computer unit and in that by the computer unit a change of the work- and open spaces is determined over time. For instance, after the production of the first foundation elements the provided workspace can be changed to an open space. Accordingly, depending on the working process over time, open spaces provided initially can also be reclassified to a workspace as from a certain point in time.

Moreover, the invention is developed further in a preferred way in that by the computer unit an occupancy of the open spaces is determined. Depending on an entry concerning the set-up or the working sequence in the excavation pit the computer unit can define an occupancy of the open spaces by working apparatuses, tools and/or working materials and the occupancy can be suggested accordingly. On the basis of given parameters, such as time data concerning the material requirement or the work assignment, the occupancy can be defined by the computer unit as to which apparatuses, tools or materials are to be stored in which position and over which period of time. In this way, the working process inside the excavation pit and the utilization of location and space can be realized more efficiently.

Another advantageous method variant furthermore resides in the fact that the at least one working apparatus is provided with a data transmission means, via which the working apparatus transmits current data regarding the working apparatus, the location and/or the processing operation to the computer unit. In the computer unit it can be verified if the working apparatus actually used corresponds to the provided working apparatus or if a deviation is present that has an effect on the distribution of spaces, in particular with regard to workspace and open space. In addition, by way of the central computer unit the next upcoming work task and a related displacement distance can be displayed to the operator on the working apparatus. In the case of working apparatuses having an automatic or also a driverless driving means the central computer unit can also transmit direct driving instructions to the working apparatus via the preferably wireless data connection.

Moreover, according to an embodiment of the invention it is preferred that by means of a detection means an actual state of the excavation pit is detected and by the computer unit a verification of actual and target state is carried out. Through this, an especially safe working process can be carried out in an excavation pit.

It is particularly advantageous that as detection means at least one camera is provided. The camera is preferably installed at an elevated point in the excavation pit or on a flying drone or preferably on a working apparatus, more particularly a mast of a working apparatus. Provision can also be made for several cameras, by which the actual current location of working apparatuses, materials and also of open spaces and workpaths are detected as actual state. By way of a corresponding software the actual state can thus be compared with a target state in the computer unit. In particular, in the computer unit instructions to working apparatuses and their operators or also warning instructions can be transmitted, e.g. if objects are determined by the detection means in the working range or on driveways.

Another preferred embodiment of the invention can be seen in the fact that by the computer unit transport means for the supply and discharge of material to the work- or storage spaces are controlled. The transport means can be cranes or transport vehicles in particular. Control can take place in a direct way if the transport means are provided for automatic navigating and movement. But an indirect control can also be implemented in that an operator of the corresponding transport means is given operative instructions for displacement of the corresponding transport means.

Basically, the invention also comprises an installation or a system, with which the previously described method can be carried out in particular with regard to the determination of work- and open spaces.

The invention claimed is:

1. A construction method, in which
an excavation pit is produced in the ground,
in the excavation pit, foundation elements are produced at predetermined working points with at least one working apparatus, and
an optical marking is displayed, with a display means, on a surface of the excavation pit,
wherein
in a computer unit, the dimensions of the excavation pit, the working points, and the dimensions of the at least one working apparatus are entered,
in the computer unit, a required workspace for the at least one working apparatus and an open space in the excavation pit are determined automatically based on the dimensions of the excavation pit and the dimensions of the at least one working apparatus,
in the computer unit, a working sequence for performing work over time is determined automatically based on the required workspace for the at least one working apparatus and the open space in the excavation pit, and
the optical marking indicates a portion of the open space or the at least one working apparatus.

2. The construction method according to claim 1, wherein
as a working apparatus, a pile drilling apparatus, an anchor drilling apparatus, and/or a diaphragm wall apparatus is used.

3. The construction method according to claim 1, wherein
as a foundation element, a foundation pile, a tension anchor, an injection anchor, and/or a diaphragm wall is produced.

4. The construction method according to claim 1, wherein
for the determined spaces, it is specified which part is provided as driveway or storage space.

5. The construction method according to claim 1, wherein
the display means comprises an optical projection element, in particular a laser.

6. The construction method according to claim 1, wherein
by the computer unit, a change of the work- and open spaces is determined over time.

7. The construction method according to claim 1, wherein
by the computer unit, an occupancy of the open spaces is determined.

8. The construction method according to claim 1, wherein
the at least one working apparatus is provided with a data transmission means, via which the working apparatus transmits current data regarding the working apparatus, the location, and/or the processing operation to the computer unit.

9. The construction method according to claim 1, wherein
by means of a detection means, an actual state of the excavation pit is detected and, by the computer unit, a verification of actual and target state is carried out.

10. The construction method according to claim 9, wherein
as detection means, at least one camera is provided.

11. The construction method according to claim 1, wherein
by the computer unit, transport means for the supply and discharge of material to the work- or storage spaces are controlled.

12. The construction method according to claim 1, wherein
by the computer unit, at least portion of the required workspace is reclassified to be a part of the open space during execution of the working sequence.

13. The construction method according to claim 1, wherein
by the computer unit, at least portion of the open space is reclassified to be a part of the required workspace during execution of the working sequence.

\* \* \* \* \*